Oct. 16, 1934.  A. G. MADDIGAN ET AL  1,977,342
LUBRICATION INDICATOR
Filed Nov. 4, 1932   2 Sheets-Sheet 1

Oct. 16, 1934. A. G. MADDIGAN ET AL 1,977,342
LUBRICATION INDICATOR
Filed Nov. 4, 1932 2 Sheets-Sheet 2
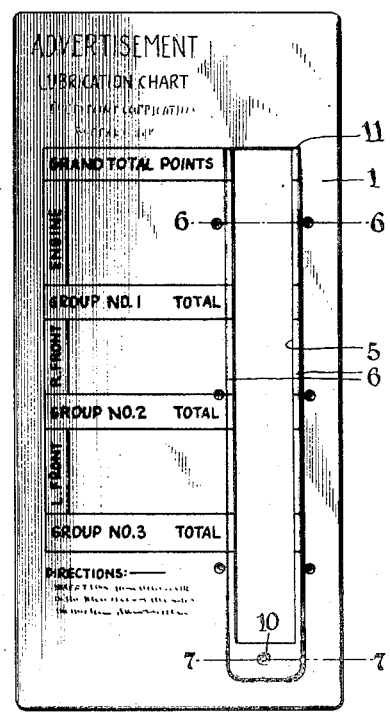
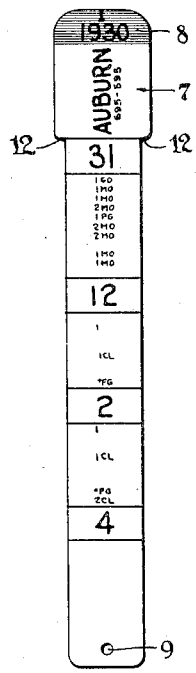
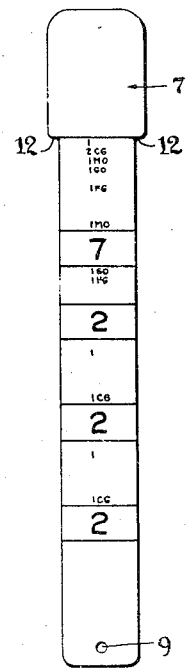
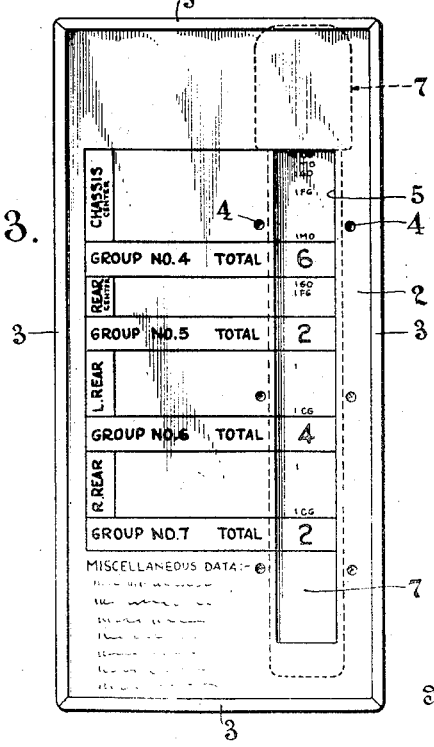
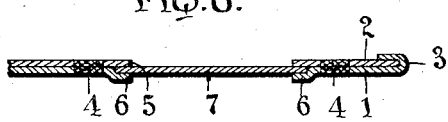
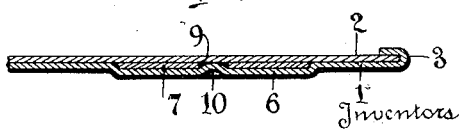
Inventors
Arthur G. Maddigan,
Harry E. Nehin, and
Raymon E. Rousseau.
By Bean & Brooks, Attorneys Patented Oct. 16, 1934

1,977,342

UNITED STATES PATENT OFFICE 1,977,342

LUBRICATION INDICATOR

Arthur G. Maddigan, Harry E. Nehin, and Raymon E. Rousseau, Buffalo, N. Y.; said Nehin and said Rousseau assignors to said Maddigan Application November 4, 1932, Serial No. 641,302

5 Claims. (Cl. 40—64)

This invention relates to an improvement in lubricating indicators for use in connection with automobiles and is more especially directed to a lubrication device which requires a minimum number of parts, is simplified and yet positive in the results it obtains.

In the lubrication of automobiles it has long been recognized that the methods and apparatus now in use are inefficient and that they fail to insure that every lubricating point will be noticed and correctly lubricated. It has been the experience of practically every motorist that one or more lubrication points on his car is completely missed during the usual lubrication process and usually his attention is called to this, by the failure of the part not lubricated and the resultant repair and expense necessitated by such imperfect lubrication job.

The present invention has for its objects to provide a lubrication indicator, to be used by persons lubricating cars, that will be compact and light and yet will visually indicate in logical groups all of the parts of the more popular cars that require lubrication; to provide a key or strip for each make and model of car; to provide each key with lubrication indicia peculiar to the make and model car the key represents, to use any key in combination with the lubrication indicator to visually register the location and number of lubrication points; to provide a compact indicator in which both sides of the chart and both sides of the keys are used; the holder having a number of characteristics of novel construction to facilitate the locating of any one or more desired keys; to provide keys having structural characteristics simplifying their location and use, and to provide a complete lubricating indicator for use with any automobile of such simplicity that it is easily operated and complete in its results.

In the drawings:

Fig. 2 is a front elevation of the master chart shown in reduced size, with the key omitted.

Fig. 3 is a rear view of the chart shown in Fig. 2.

Fig. 4 is a front view of a key strip similar to the one shown in inserted position in Figs. 1 and 2.

Fig. 5 is a rear view of the key strip shown in Fig. 4.

Fig. 6 is an enlarged section taken on line 6—6 of Fig. 2.

Fig. 7 is an enlarged section taken on line 7—7 of Fig. 2.

Figure 1:
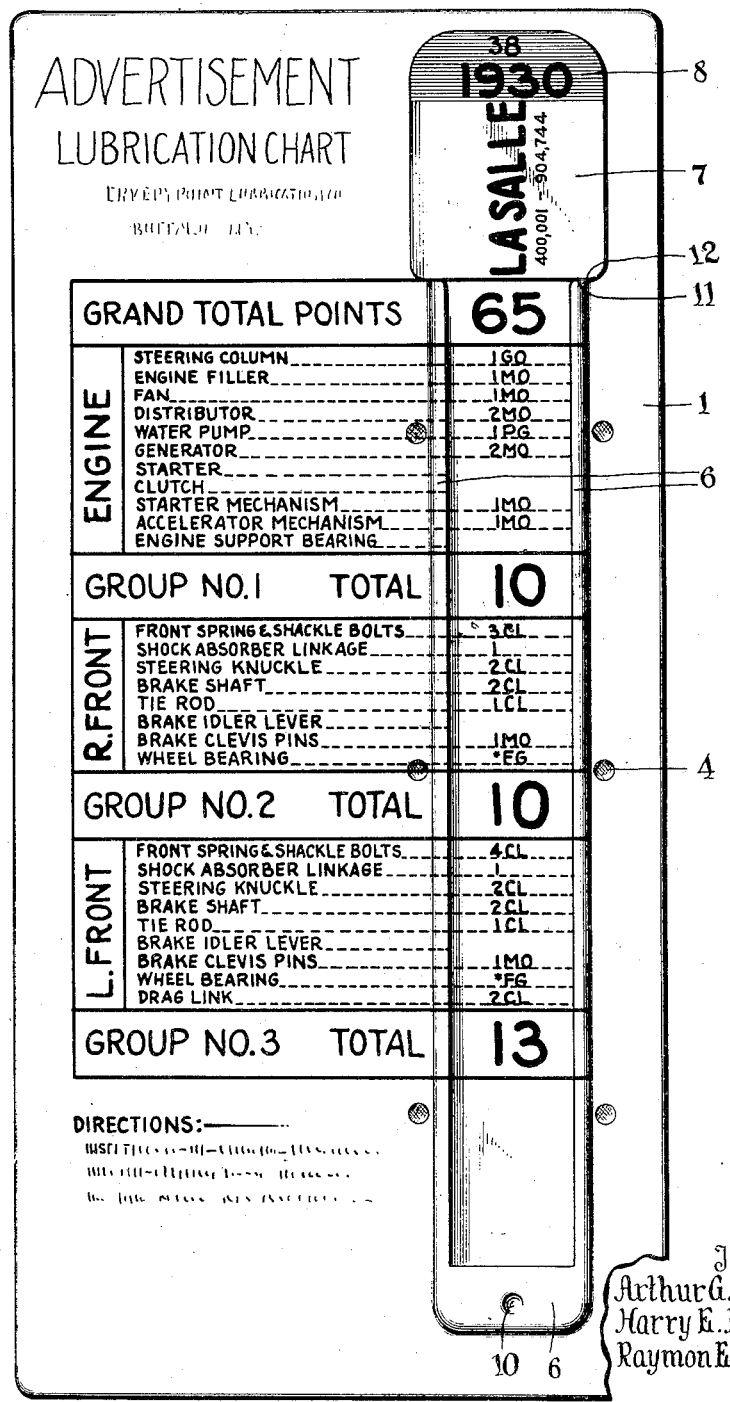
Fig. 1 is a front elevation of a master chart and key for use in this invention.

Referring in detail to the accompanying drawings, the numeral 1 designates the front of a master chart. This chart can be made of any suitable material, but a thin sheet metal is preferably used as it is less likely to be damaged by the rough usage to which the device is put.

The chart is formed of front and rear panels, the rear panel being designated 2, and they are united at their edges by rolling the front marginal edges 3 over the rear panel. The two panels may also be united by spot welds 4, or by riveting or any other desired manner.

The chart 1 is provided with an aperture 5 formed by cutting or stamping out the front and rear panels. Outwardly extending marginal side and bottom edges 6 are formed around the aperture on the front panel to space said marginal edges away from the marginal edges around the sides and bottom of the back panel aperture and form guides for key strips 7.

The face of the chart and also the rear bears predetermined indicia essential to the operation of the structure. As shown in Fig. 1, the face of the chart bears the designation "Grand total points" and below that, the subdivisions, "Group No. 1 total", "Group No. 2 total" and "Group No. 3 total". The object of these groupings is to logically group together the names of the parts of an automobile that require lubrication attention. For example Group No. 1 as shown in Fig. 1, pertains to parts to be lubricated about the engine; Group No. 2 to other parts in the right front of an automobile. Group No. 3 to other parts in the left front of an automobile.

The rear of the chart contains the same type of indicia shown on the face of the chart and, as shown in Fig. 3, we have Group No. 4, "Chassis center"; Group No. 5, "Rear center"; Group No. 6 "L. rear" and Group No. 7 "R. rear". Below Group No. 7 space is left to receive the names of any desired miscellaneous parts.

The key strips 7 are formed in the shape of a key from thin strip metal or other suitable material and one key strip is provided for each type of car for each year and for each series of car in any given year, when the cars of different series have different positions and numbers of lubrication points. Designating numbers are placed on each key, such as "38" on the top of the key shown in Fig. 2, and "1" on the top of the key shown in Fig. 4. The keys have colored top marginal portions 8, a different color being used for each year so that the year the key represents is more clearly designated.

Each key is provided on its face and back with indicia pertinent to the lubrication of the particular car, year and series the key represents. The indicia on the key represents the total number of lubrication points on a particular car, the individual lubricaton points on a car arranged in groups, and the individual group totals. In other words, the indicia on the key is divided into groups to register with the groups on the case. The indicia indicative of the individual lubrication points on each key also specifies in abbreviated form the type of lubricant to be used for that particular point.

Each key is also provided with an aperture 9 near its lower marginal edge and the face of the case is provided with a detent 10, in order that the detent may frictionally engage the aperture on the key when the device is assembled.

The operation of the indicator is as follows: a 1930 La Salle, for instance, is taken to a service station for lubrication. The man who is to do the lubricating is supplied with a chart and a complete set of keys. From the set of keys he takes the one key marked "1930 La Salle" and inserts it in the top of guides 6 at 11, then presses it downwardly between the guides 6 until the shoulders 12 of the key strike against the upper edge of the guide 6 at 11, at which time the detent 10 will engage the aperture 9 of the key and frictionally hold the key in detachable engagement with the chart. When the key is in assembled relation to the chart, the indicia on the key will register with a portion of the indicia on the chart and show all of the lubricating information needed to lubricate that particular car. Opposite the indicia "Grand total points" on the case will be seen 65 on the key, showing that there is a total of 65 points to be lubricated; opposite "Steering column" will appear "1"; opposite "Engine filler" will appear "1"; opposite "Fan" will appear "1"; opposite "Distributor" will appear "2", showing that two points on the distributor are to be lubricated. The remainder of the indicia will register in like manner, except that it will be noted there will be blanks opposite some of the names of parts which will show that on that particular car, year and series either such parts are missing or do not require lubrication.

The indicia is, as stated, divided into logical groups in the grouping shown seven groups are used, but it is easily seen that a greater or lesser number of groups may be used if desired, or that the group idea could even be eliminated without destroying the principle of this invention.

One of the reasons for using a logical system of groups is to facilitate the work of the lubricator. He can look at the lubrication indicator just described and lubricate the parts following the indicator sequence and after lubricating all of the parts in one group, check on the indicator the total lubrication points in that group against the portion of the car he has just lubricated. When the job on the La Salle has been completed, the key is removed from the chart and placed with the remainder of the set of keys.

Any other car can be lubricated in the manner previously described—the key for that car being placed in the chart or master chart. It is of course readily understood that various types of cars have different numbers of parts to be lubricated, and that various types of cars have different parts from each other. The master chart has the names of all the lubrication parts of various automobiles. The data about individual cars is placed on the individual key and when any key is placed in the chart, complete lubrication information about the particular car that key presents is registered.

One advantageous form of the invention is to have a portion of the lubrication indicia on both the face and back of the chart, and the front and back of the key, and the structure is so devised that when the key is in position in the chart the entire device is intended to be turned end over end, and, as shown in Fig. 3, the last portion of the indicia in register will be found on the back of the device. In the embodiment shown in Figs. 1 and 2, three groups of indicia are shown on the face and the remaining four groups on the rear, as shown in Fig. 3. This feature of the ability to use both sides of the chart as an indicator, using the same key and without shifting any of the parts of the device, provides an extremely compact and efficient device. It is easy to see, however, that the device could be constructed with all of the desired indicia on the face of the chart and front of the keys and with the back of the chart solid, without departing from the spirit of the invention.

Although only one form of the invention has been shown and described in detail it will be apparent to those skilled in the art that the invention is not so limited, but that various changes may be made therein without departing from the spirit of the invention or from the scope of the appended claims:

We claim:

1. In a lubrication indicator, a reversible master chart having surfaces for receiving grouped indicia on its front and back representing parts of automobiles to be lubricated, a plurality of key strips each having surfaces for receiving designating indicia and lubricating indicia, each key strip being insertable in the master chart, said surfaces cooperating in assembled relation of chart and key to establish predetermined relation between the lubricating indicia and the grouped indicia whereby the position and number of lubrication points on any given automobile are indicated.

2. In a universal motor vehicle lubrication indicator, a master chart having surfaces for receiving general lubrication indicia, a plurality of individual key strips having surfaces for receiving specific lubrication indicia applicable to the individual motor vehicle for cooperation with the indicia on the master chart, guide means on the master chart for receiving and positioning a key strip, and frictional locking means in connection with the chart and key strip to retain the key strip in operative relation whereby cooperating surfaces present lubrication indicia in proper combination to provide complete lubrication information for a predetermined motor vehicle.

3. In a lubrication indicator for automobiles, a master chart and a plurality of interchangeable key strips, the front and the back of the master chart having means for presenting permanent indicia representing the lubrication points on various kinds of automobiles, said chart having an apertured portion adapted to receive any one of the plurality of key strips, each key strip representing an automobile of particular make and year and having means for presenting indicia on both front and back thereof representing the total number of lubrication points and the individual lubrication points on the automobile, said means for presenting total lubrication point indicia and the individual lubrication point indicia being located on the individual key strip in predetermined position to register with the means for presenting permanent indicia on the master chart.

4. In a lubrication indicator for automobiles, a master chart having means for presenting permanent indicia on its face and back arranged in logical groups and representing the lubrication points on automobiles; a key strip having means on opposite sides thereof for presenting lubrication point indicia arranged in predetermined locations, said chart having an aperture opposite its indica adapted to receive any one of a plurality of key strips, said strip and chart in assembled relation having their means registering to present the key strip indicia registering with the chart indicia in displaying complete lubricating information.

5. In a lubrication indicator, a chart provided with means for presenting permanent indicia representing lubrication points on a plurality of automobiles, a key strip retaining portion opposite said means, and a plurality of key strips representing different kinds of automobiles each key strip having surface sections presenting automobile bearing indicia, each strip in its normal operative position being retained in said retaining portion with said means and surfaces registering to present a series of chart and key indicia combinations conveying complete lubrication directions for a given automobile.

ARTHUR G. MADDIGAN.
HARRY E. NEHIN.
RAYMON E. ROUSSEAU.